United States Patent [19]

Uzuka

[11] 4,114,073
[45] Sep. 12, 1978

[54] BRUSHLESS MOTOR DRIVING CIRCUIT

[75] Inventor: Mitsuo Uzuka, Urawa, Japan

[73] Assignee: Sony Corporation, Tokyo, Japan

[21] Appl. No.: 810,982

[22] Filed: Jun. 29, 1977

[30] Foreign Application Priority Data

Nov. 19, 1976 [JP] Japan .................. 51-139903

[51] Int. Cl.² ........................................... H02K 29/00
[52] U.S. Cl. ..................................... 318/138; 318/254
[58] Field of Search ...................... 318/138, 171, 254

[56] References Cited

U.S. PATENT DOCUMENTS

| | | | |
|---|---|---|---|
| 3,716,769 | 2/1973 | Brunner | 318/138 X |
| 3,839,661 | 10/1974 | Wada | 318/138 |
| 3,864,610 | 2/1975 | Kawamoto et al. | 318/138 |
| 3,986,086 | 10/1976 | Muller | 318/138 |

*Primary Examiner*—Gene Z. Rubinson

*Attorney, Agent, or Firm*—Lewis H. Eslinger; Alvin Sinderbrand

[57] ABSTRACT

A driving circuit for a brushless motor of the type having a permanent magnet rotor and plural phase stator windings. The driving circuit includes position detectors for detecting the rotary position of the rotor. Switching devices are provided for supplying driving currents in sequence to the plural phases of the stator windings in accordance with the position of the rotor. The durations of the driving currents are controlled such that a portion of such currents flowing through adjacent phases are overlapped when the motor is started up; but the duration of each driving current is reduced as the motor approaches a normal speed so as to correspondingly reduce the overlapped portions. Preferably, the durations of the currents are reduced as the speed of the motor increases until such currents no longer have overlapped portions.

16 Claims, 19 Drawing Figures

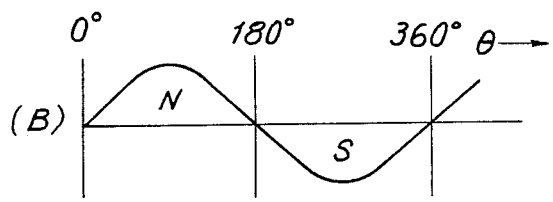
FIG. 3A (B)
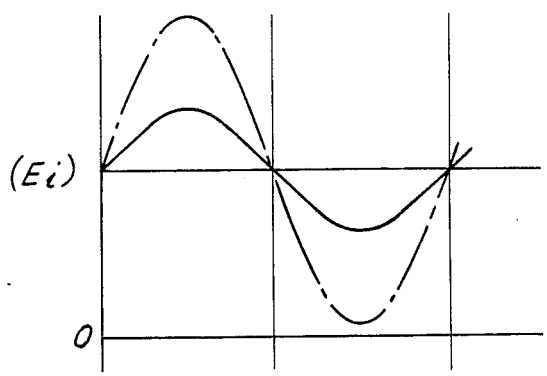
FIG. 3B (Ei)
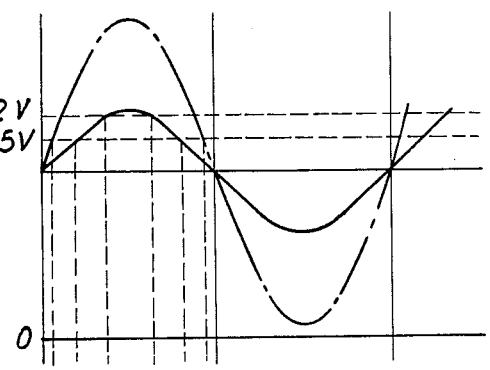
FIG. 3C (E₀)
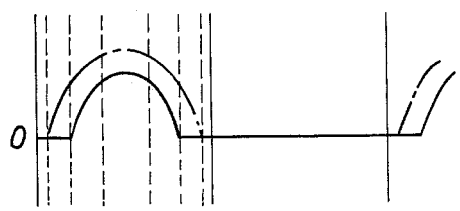
FIG. 3D (Ib)
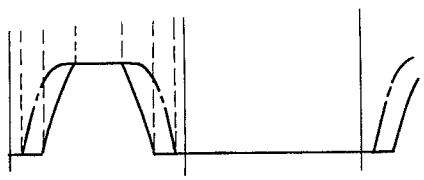
FIG. 3E (Ic)

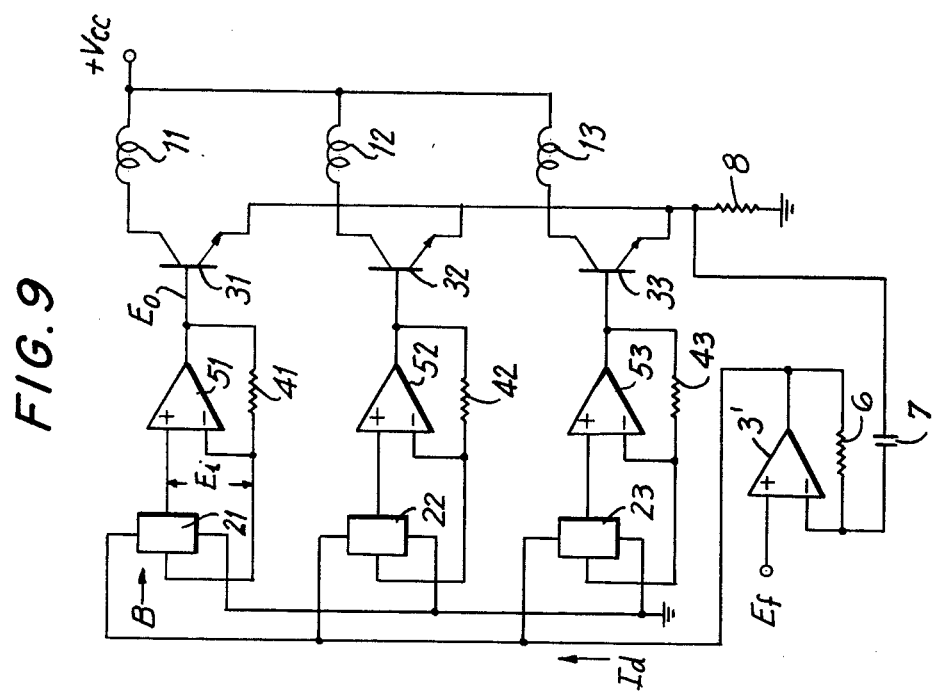
FIG. 9
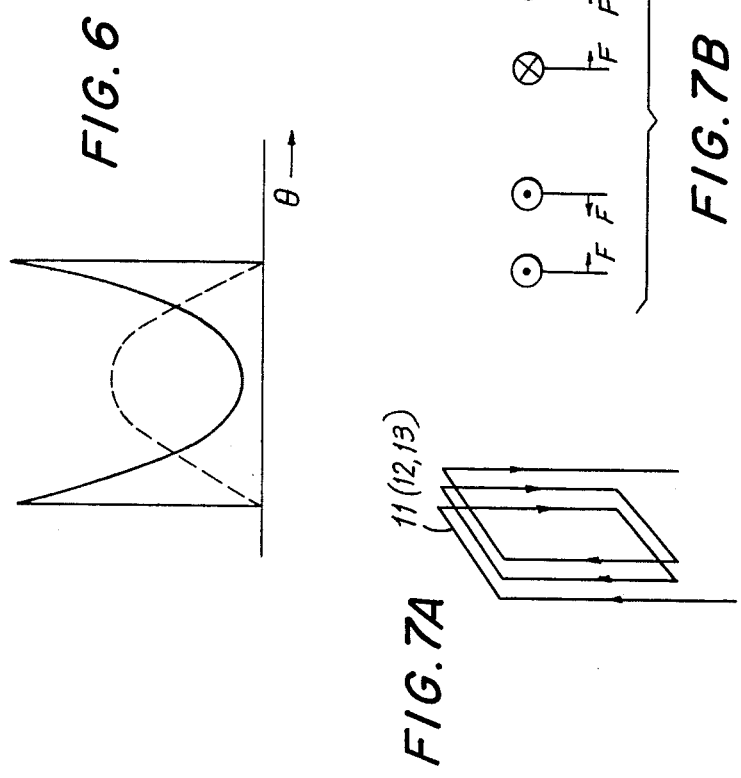
FIG. 6
FIG. 7A
FIG. 7B
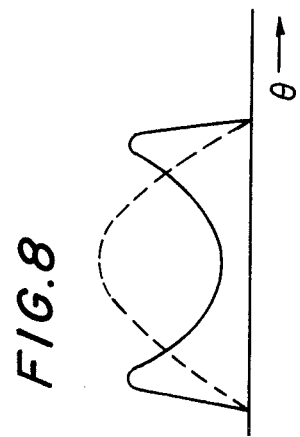
FIG. 8

BRUSHLESS MOTOR DRIVING CIRCUIT

BACKGROUND OF THE INVENTION

This invention relates to a driving circuit for a brushless motor and, more particularly, to such a circuit exhibiting a simplified construction which produces driving currents that are controlled automatically to provide a high starting torque for the motor yet function to drive the motor with high efficiency and without unnecessary power consumption.

In a typical brushless motor, the rotor is formed of a permanent magnet and the stator is formed of plural phase windings. When the windings are selectively energized, the flux derived therefrom interacts with the flux generated by the permanent magnet rotor, resulting in a force exerted upon the rotor to cause rotation. The driving circuit for a brushless motor generally is arranged such that drive currents flow through successive stator winding phases in sequence.

A drive circuit for a brushless motor of the aforementioned type may include a switching device, such as a transistor, SCR, or the like, connected in series with each stator winding phase. The switching devices are triggered sequentially, thereby permitting drive currents to flow through the corresponding phases in proper sequence. The rate at which such switching devices are triggered should be a function of rotor speed; and position sensing elements may be provided to control the triggering of the switching devices in accordance with the rotary position of the rotor.

During an initial start-up operation of a brushless motor, the starting torque desirably should be a maximum. Since torque is dependent upon the currents flowing through the stator windings, the start-up currents should be relatively high. One manner in which the start-up currents can be increased is merely to increase the magnitude of the drive currents which flow through the switching devices. However, the current saturation level of a typical switching device will limit the maximum current magnitude which can flow through the stator windings. Another manner in which the start-up currents can be increased is to increase the period during which each current flows through its respective stator winding phase. As a simple example, if the brushless motor is formed with a two-pole rotor and three stator winding phases, a higher start-up torque will be produced if a current flows through each phase for a duration greater than 360°/3 = 120°. This duration, or current angle, should be increased such that successive stator phase drive currents overlap.

Although greater torque generally is required during a motor start-up operation, once the normal operating speed of the motor has been attained, that is, the speed at which the motor was designed to operate, the torque can be reduced. One problem is that if the successive stator phase drive currents have overlapping portions during the motor start-up operation, these overlapping currents during normal motor operation result in a reduction in the average magnetic flux linkage, whereby the motor exhibits relatively poor efficiency. That is, at normal motor speeds, an unnecessarily high amount of power is required to drive the motor.

Another problem is that if a brushless motor drive circuit is designed to be more efficient at normal motor operating speeds, the sequential drive currents flowing through the stator phases should exhibit no overlapping portions so as to avoid reducing the average magnetic flux linkage. However, this generally means that the start-up torque is relatively low. In the aforementioned simplified example wherein the brushless motor is formed of three stator winding phases, a current angle of 120° through each phase will result in a significant ripple factor in the torque. This ripple factor also is undesired.

Another problem associated with brushless motor drive circuits resides in the waveform of the drive currents which flow through the stator winding phases. The force acting upon adjacent conductors included in a stator winding phase is proportional to the magnitude of the current flowing through such conductors. If the driving current waveform is a rectangular pulse having vertical leading and trailing edges, that is, having relatively short attack and decay times, the rapid change in current at these leading and trailing edges is acccompanied by a corresponding rapid change in the force exerted upon adjacent conductors. This, in turn, causes the conductors in the stator winding phase to vibrate, thereby producing a disturbing sound. In order to avoid this problem of vibrating conductors, various capacitors would have to be connected to the switching devices in order to modify the driving current waveform, that is, to increase the attack and decay time of the current pulses. Such capacitors increase the cost and complexity of the current driving circuit.

OBJECTS OF THE INVENTION

Therefore, it is an object of the present invention to provide an improved driving circuit for a brushless motor which avoids the problems mentioned hereinabove.

Another object of this invention is to provide a driving circuit for a brushless motor that provides a high starting torque.

A further object of this invention is to provide a driving circuit for a brushless motor that operates at relatively high efficiency when the motor is driven at normal operating speeds, thereby reducing the amount of power which must be consumed in order to so drive the motor.

An additional object of this invention is to provide a driving circuit for a brushless motor wherein the ripple factor in the starting torque is reduced.

Yet another object of this invention is to provide a driving circuit for a brushless motor wherein vibrations in the motor windings caused by driving currents are reduced.

A still further object of this invention is to provide a driving circuit for a brushless motor wherein drive currents supplied to respective phases of the motor windings are of such duration as to have overlapping portions during a motor start-up operation, which overlapping portions are reduced automatically as the motor is driven towards its normal operating speed.

Various other objects, advantages and features of the present invention will become readily apparent from the ensuing detailed discussion, and the novel features will be particularly pointed out in the appended claims.

SUMMARY OF THE INVENTION

In accordance with the present invention, a driving circuit for a brushless motor of the type having a permanent rotor and plural phase stator windings is provided, the driving circuit including position detectors for detecting the rotary position of the rotor; switching devices for supplying driving currents in sequence to the plural phases of the stator windings in accordance with the position of the rotor, a portion of the driving currents flowing through adjacent phases being overlapped when the motor is started up; and a control circuit for reducing the duration of each driving current as the motor approaches a normal operating speed so as to correspondingly reduce the overlapped portions of the driving currents. In a preferred embodiment, the duration of each driving current is reduced until the driving currents flowing through adjacent phases no longer have overlapped portions.

BRIEF DESCRIPTION OF THE DRAWINGS

The following detailed description, given by way of example, will best be understood in conjunction with the accompanying drawings in which:

FIGS. 3A-3E are waveform diagrams which will be discussed in conjunction with the operation of the driving circuit shown in FIG. 2;

FIG. 6 is a waveform diagram which is useful in explaining the problem of stator winding vibration;

FIGS. 7A-7B are schematic diagrams of stator windings which may be susceptible to vibration;

FIG. 8 is a waveform diagram which is helpful in understanding how the present invention reduces winding vibration;

FIG. 9 is a schematic diagram of another embodiment of the present invention;

DETAILED DESCRIPTION OF CERTAIN PREFERRED EMBODIMENTS

Figure 1:
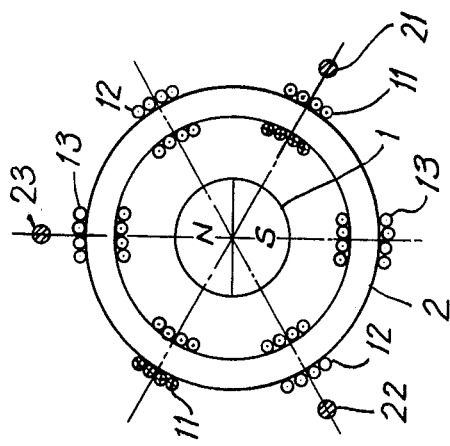
FIG. 1 is a schematic diagram of one embodiment of a brushless motor with which the present invention can be used.

A typical brushless motor with which the present invention can be used is schematically illustrated in FIG. 1. For the purpose of simplification, rotor 1 of this motor is shown as a two-pole rotor, and is formed of a permanent magnet. A stator is disposed about rotor 1 and is formed of a core 2 having individual windings 11, 12 and 13, hereinafter stator phases, wound about the core. Position detectors 21, 22 and 23 are disposed adjacent phases 11, 12 and 13, respectively, and are adapted to detect the relative position of rotor 1 with respect thereto so as to produce time-varying output signals as a function of detected rotor position. In a preferred embodiment, the position detectors are comprised of Hall-effect elements, each Hall element producing a sinusoidal output signal as rotor 1 makes one complete rotation. Various alternative embodiments of the position detectors can be used, such as photosensors, magnetic sensors, and the like. The following discussion will, however, assume that these position detectors are formed of Hall elements.

Although rotor 1 is shown as a two-pole rotor, it should be appreciated that, if desired, the rotor may comprise additional poles formed of permanent magnets. Similarly, the stator windings may include a greater number of phases.

In operation, rotor 1 is driven by supplying driving currents, in sequence, to the respective phases of the stator windings. The interaction between the flux generated by the energized phase and the flux generated by rotor 1 imparts a rotational force upon the rotor. In the illustrated embodiment, it is assumed that the motor is being driven at a time during which phase 11 is supplied with a driving current.

Figure 2:
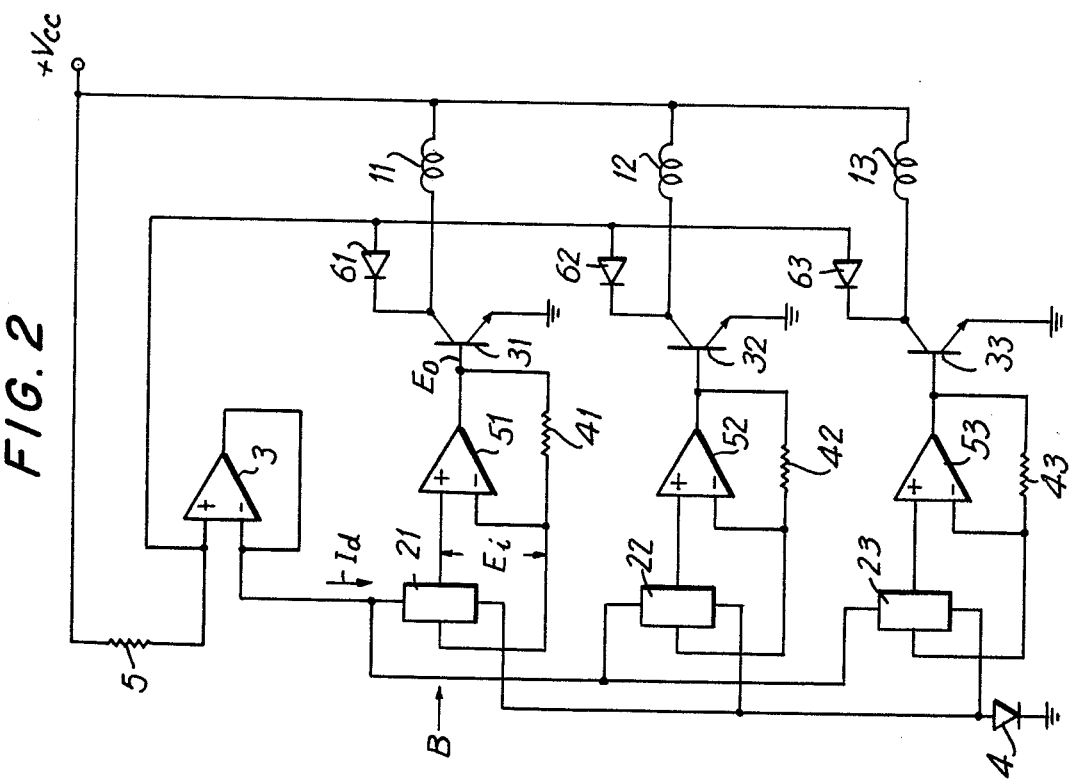
FIG. 2 is a schematic diagram of one embodiment of a driving circuit in accordance with the present invention.

Turning now to FIG. 2, one embodiment of a driving circuit in accordance with the present invention is schematically illustrated. Phases 11, 12 and 13, as well as position detectors 21, 22 and 23, previously described with respect to FIG. 1, are shown in FIG. 2. The driving circuit for each phase is substantially identical and is comprised of a switching device, such as a transistor, SCR, or the like, having its output circuit connected in series with a respective phase, and its input circuit connected to receive a drive signal. The drive signal is derived from the output produced by a corresponding position detector which is amplified by a suitable amplifier. Thus, as shown, transistors 31, 32 and 33 have their respective collector-emitter circuits connected in series with phases 11, 12 and 13, respectively, and their base-emitter circuits connected to the outputs of position detectors 21, 22 and 23, respectively, via amplifiers 51, 52 and 53, respectively. Each amplifier is shown as an operational amplifier having inverting and non-inverting inputs. The non-inverting input of each amplifier is connected to the output of its associated position detector, and the inverting input of each amplifier is connected to a reference potential, such as ground, through an equivalent resistance formed of its associated position detector and a diode 4. In addition, a feedback resistor 41, 42 and 43 is connected between the output and the inverting input of amplifiers 51, 52 and 53, respectively.

Additional circuitry is provided for the purpose of rendering transistors 31, 32 and 33 conductive for longer durations during a motor start-up operation, and then decrease the duration of conductivity of the respective transistors as the motor approaches its normal operating speed. This circuitry is formed of an amplifier 3, shown as an operational amplifier and having an output coupled in common to the current supply inputs of Hall elements 21, 22 and 23, a non-inverting input coupled through a resistor 5 to a source of operating potential $+V_{cc}$ and an inverting input to which the output is connected in feedback relation. As may be appreciated, amplifier 3 is connected as a unity gain amplifier having a very high input impedance and a very low output impedance. Also, diodes 61, 62 and 63 are provided with their cathodes connected to the collectors of transistors 31, 32 and 33, respectively, and their anodes connected in common to the non-inverting input of amplifier 3. These diodes function to detect the lowest transistor collector voltage at any given instant of time, and to supply this lowest voltage to the non-inverting input of amplifier 3.

In operation, each of the drive circuits connected to the respective phases 11, 12 and 13 functions in substantially the same way. Accordingly, in the interest of simplification, only the circuit connected to phase 11 will be described. Assuming that the position detectors are comprised of Hall elements, Hall element 21 produces an output voltage $E_i$ as a function of the magnetic flux density B generated by rotor 1 and a control current $I_d$ in accordance with the expression $E_i = K \cdot B \cdot I_d$, where K represents the Hall coefficient.

If the equivalent resistance of Hall element 21 is assumed to be equal to $R_1$, then the output of amplifier 51 is connected to ground through resistor 41 and this equivalent resistance $R_1$. The junction defined by resistor 41 and resistance $R_1$ is connected to the inverting input of amplifier 51. In this configuration, amplifier 51 may be recognized as a non-inverting amplifier having a high input impedance and a low output impedance. Now, if the resistance of resistor 41 is represented as $R_2$, then the amplified output $E_o$ produced by amplifier 51 can be expressed as $$E_o = E_i (1 + \frac{R_2}{R_1}).$$

Thus, the output voltage $E_o$ varies in accordance with the Hall element output voltage $E_i$ which, in turn, is determined by the magnetic flux density B and the control current $I_d$.

During normal operation of the motor, that is, when the motor is operating at its normal speed, the flux density B detected by Hall element 21 appears as the sinusoidal waveform shown in FIG. 3A. For the illustrated example wherein rotor 1 merely is a two-pole rotor, the sinusoidal fluctuation of flux density B completes one full cycle as the rotor completes a full rotation. Hence, in this example, the electrical angle $\theta$ is equal to the mechanical angle of rotation. If rotor 1 was formed of a four-pole rotor, then flux density B would complete two full cycles during the time required for the rotor to complete a full rotation. In that event, the electrical angle $\theta$ would not be equal to the mechanical angle. Similarly, if rotor 1 is formed of n pairs of poles, the flux density B would complete n cycles during each rotor rotation.

Let it be assumed that control current $I_d$ is constant. Hence, the output voltage $E_i$ produced by Hall element 21 merely is a function of the fluctuating flux density B and is represented by the waveforms shown by the solid line in FIG. 3B. The DC level of voltage $E_i$ is determined by the equivalent resistance $R_1$ of the Hall element plus the equivalent diode resistance of diode 4. This DC level is a positive level relative to the 0 axis. Voltage $E_i$ is amplified by amplifier 51 and supplied to the base electrode of transistor 31 as voltage $E_o$ shown as the solid curve in FIG. 3C. This amplified voltage also exhibits a relatively positive DC level.

Transistor 31 has an inherent base-emitter threshold voltage which must be exceeded before the transistor is rendered conductive. As a typical example, the base-emitter threshold voltage of most silicon transistors is 0.65 volts. This threshold level is shown by the broken line in FIG. 3C. When the amplified voltage $E_o$ exceeds the base-emitter threshold voltage, transistor 31 is rendered conductive and base current $I_b$ begins to flow, as shown by the solid curve in FIG. 3D. A collector current $I_c$ flows from the source of operating voltage $+V_{cc}$, through phase 11 and through the collector-emitter circuit of transistor 31 in response to the base current $I_b$. This collector current is shown by the solid curve in FIG. 3E.

When the base voltage applied to transistor 31 exceeds a second threshold level, hereinafter the saturation threshold level, a substantially constant collector current will flow for as long as the base voltage exceeds this saturation threshold level. As one example, the saturation threshold level may be 1.2 volts. Thus, when amplified voltage $E_o$ exceeds 1.2 volts, shown by the broken line in FIG. 3C, transistor 31 will be saturated, and its collector current $I_c$ will be constant as shown in FIG. 3E. If the equivalent load resistance of transistor 31 is represented as R, then the saturation current $I_c$ can be represented as $V_{cc}/R$. Thus, it is seen that as the amplified voltage $E_o$ fluctuates as a sinusoidal waveform, the current $I_c$ which flows through phase 11 exhibits a gradually increasing portion, a substantially constant portion and a gradually decreasing portion as shown in FIG. 3E. This waveform represents a clipped sinusoidal half-cycle. In the illustrated embodiment wherein the motor is formed of three stator winding phases, the gain of each of amplifiers 51, 52 and 53 and the base-emitter threshold voltages of each of transistors 31, 32 and 33 are selected such that when the motor operates at its normal speed, the duration of each collector current $I_c$ (FIG. 3E) is approximately equal to about 120°. Hence, it is appreciated that amplified voltage $E_o$ produced by each amplifier exceeds the base-emitter threshold level of each transistor for a duration corresponding to approximately 120°. Stated otherwise, the current angle for each drive current which flows through phases 11, 12 and 13, respectively, is equal to approximately 120°. Hence, when the motor operates at its normal speed, there is no overlap in the time during which currents flow through the respective stator phases. Stated otherwise, current flows, in sequence, through, for example, phase 11, then phase 12 and then phase 13, but at any given instant of time, current does not flow through any two phases simultaneously.

Figure 4A:
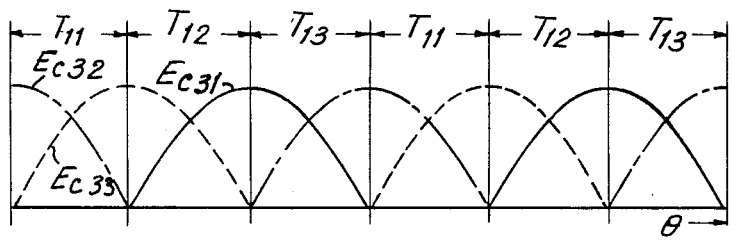
FIGS. 4A-4C are waveform diagrams which are useful in explaining the operation of the driving circuit shown in FIG. 2.

During normal motor operating speeds, since transistor 31, 32 or 33 is conductive at any given instant of time, there always will be one collector electrode that is provided with ground potential. Since the common connection of anodes of diodes 61, 62 and 63 is provided with the lowest voltage present at any given instant of time at the collector electrodes of transistors 31, 32 and 33, it is appreciated that ground potential will be maintained at this connection for normal motor speeds. Hence, the non-inverting input of amplifier 3 is supplied with a constant reference potential, thereby applying a constant control current $I_d$ to all of Hall elements 21, 22 and 23 during normal motor speeds. The foregoing operation is represented by the waveform shown in FIG. 4A wherein the curve shown in solid lines represents the collector voltage of transistor 31, the curve shown as the one-dot chain line represents the collector voltage of transistor 32 and the curve shown in broken lines represents the collector voltage of transistor 33. Time duration $T_{11}$ is the time during which transistor 31 conducts current through phase 11, time duration $T_{12}$ is the time during which transistor 32 conducts current through phase 12 and time duration $T_{13}$ is the time during which transistor 33 conducts current through phase 13. As shown, the collector voltage $E_{c31}$ is at ground potential during time duration $T_{11}$, collector potential $E_{c32}$ is at ground potential during time duration $T_{12}$, and collector voltage $E_{c33}$ is at ground potential during time duration $T_{13}$. Thus, if these respective collector voltages $E_{c31}$, $E_{c32}$ and $E_{c33}$ are applied to diodes 61, 62 and 63, approximate ground potential always will be provided at the common connection of these diodes and supplied to the non-inverting input of amplifier 33. That is, as rotor 1 rotates, collector voltage $E_{c31}$ is at ground potential during 120° of rotation, collector voltage $E_{c32}$ is at ground potential during the next 120° of rotation and collector voltage $E_{c33}$ is at ground potential during the final 120° of rotation. It is appreciated that, since the voltage applied to the non-inverting input of amplifier 3 is relatively low, control current $I_d$ likewise is low. Hence, the Hall element output voltages $E_i$ appear as shown by the solid line in FIG. 3B.

Figure 4B:
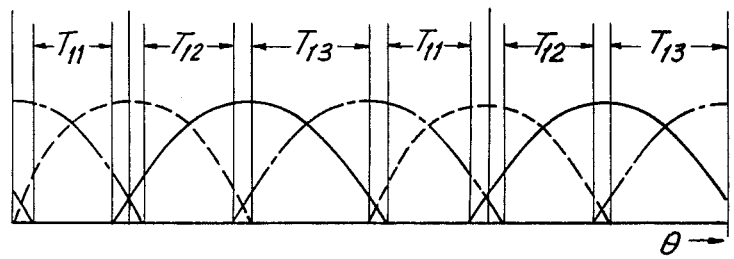
Figure 4C:
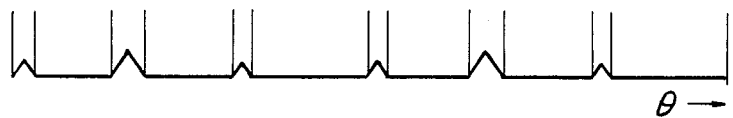

The embodiment shown in FIG. 2 also provides good current regulation properties, as will now be described. Let it be assumed that transistors 31, 32 and 33 are triggered such that the current angles through phases 11, 12 and 13, respectively, are less than 120°. This can be caused by, for example, an increase in the motor load. As a consequence thereof, there will be some instance of time wherein no current flows through any of the stator phases. This is represented by the waveforms shown in FIG. 4B. Thus, the collector voltages of the respective transistors appear as shown by the solid line, the one-dot chain line and the broken line of FIG. 4B. When these voltages are applied to diodes 61, 62 and 63, the resultant voltage provided at the common-connected anodes and supplied to the non-inverting input of amplifier 3 is as shown in FIG. 4C. This voltage corresponds to the lowest transistor collector voltage which is produced at any given instant of time. Since the voltage now supplied to amplifier 3 by diodes 61, 62 and 63 no longer is a substantially constant ground potential, the control current $I_d$ produced by amplifier 3 tends to increase. This increase in control current produces an increase of the output voltage $E_i$ produced by Hall elements 21, 22 and 23 which, in turn, increases the amplified voltage $E_o$ produced by amplifiers 51, 52 and 53. Consequently, transistors 31, 32 and 33 are rendered conductive for a longer duration, thereby increasing the current angle of the drive currents through phases 11, 12 and 13. Therefore, because of this feedback effect proper drive currents are produced, even if the motor load increases.

As mentioned above, a higher torque is needed for a start-up operation than generally is required once the motor reaches its normal operating speed. Since torque is dependent upon the drive currents through the stator phases, an increase in torque requires an increase in current. The embodiment shown in FIG. 2 accomplishes this result by supplying drive currents through phases 11, 12 and 13 having a greater current angle during a start-up operation than during normal motor operation. Initially, transistors 31, 32 and 33 are non-conductive and current does not flow through any of the stator phases. When a suitable switch or power supply is actuated (not shown), the voltage applied to the non-inverting input of amplifier 3 is substantially equal to operating voltage $+V_{cc}$. Hence, the control current $I_d$ supplied by amplifier 3 to each of Hall elements 21, 22 and 23 is relatively high. Thus, as rotor 1 starts to rotate, the fluctuating output voltage $E_i$ produced by each Hall element exhibits a large magnitude because of the high control current $I_d$. This output voltage during a motor start-up operation is represented by the curve shown as the one-dot chain line in FIG. 3B. As a result of this higher output voltage $E_i$, the amplified voltage $E_o$ produced by amplifiers 51, 52 and 53 also is of high magnitude, as shown by the broken curve shown in FIG. 3C. A comparison between the solid and broken curves in FIG. 3C shows that the amplified voltage $E_o$ during a start-up operation exceeds the transistor base-emitter threshold level prior to the time that voltage $E_o$ exceeds this level during normal motor operation. Thus, base current $I_b$ flows through each of transistors 31, 32 and 33 for a longer duration, or greater current angle, during a start-up operation than during normal operation, as represented by the broken curve in FIG. 3D. As can be seen from the broken curve in FIG. 3E, collector current $I_c$ flows through each transistor for a greater time duration, or current angle, than when the motor is operating at its normal speed. Whereas the current angle of drive currents through each of phases 11, 12 and 13 is approximately 120° at normal speed (represented by the solid curve in FIG. 3E), during a start-up operation, the current angle is increased to almost 180°.

Since there is an overlap in the times during which respective transistors 31, 32 and 33 are conductive, it is appreciated that, at any given instant of time, the collector voltage at at least one of these transistors is at ground potential. As described above, the lowest voltage at the collector electrodes of transistors 31, 32 and 33 is fed back to the non-inverting input of amplifier 3 so as to reduce the magnitude of control current $I_d$ supplied to each of the Hall elements. Accordingly, although a high torque is provided during motor start-up, output voltage $E_i$ and amplified voltage $E_o$ are reduced as the motor begins to rotate because of the aforementioned reduction in control current $I_d$. Consequently, transistors 31, 32 and 33 are rendered conductive for shorter durations so as to reduce the current angle of the drive currents flowing through phases 11, 12 and 13. The overlap in the drive currents through these phases is reduced until each drive current exhibits a current angle approximately 120°, thereby substantially eliminating such overlap. Once the motor reaches its normal operating speed, the feedback circuit formed of amplifier 3 and diodes 61, 62 and 63 functions to regulate the motor speed in the manner described hereinabove. Thus, the current angle of the drive currents is adjusted accordingly in the event that the load of the motor changes.

Figure 5A:
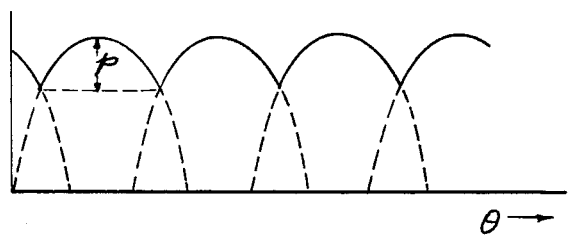
FIGS. 5A-5B are waveform diagrams which represent the improved start-up torque which is achieved by the present invention.
Figure 5B:
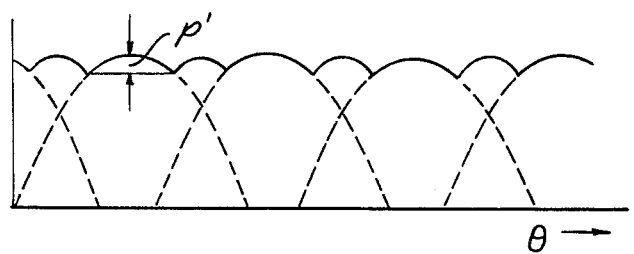

A comparison between the torque produced when the drive current angle is increased during a start-up operation by the embodiment shown in FIG. 2 with the torque produced in the event that the drive current angle during a start-up operation is the same as during normal operation is shown in FIGS. 5A and 5B. Referring to FIG. 5A wherein the ordinate represents torque and the abscissa represents the angle of rotation of rotor 1, the starting torque produced when the drive currents do not overlap is shown by the solid curve. This curve has a ripple factor having a peak magnitude represented by $p$. FIG. 5B shows the starting torque produced when the drive currents overlap, as described above. In the waveform of FIG. 5B, it is seen that the ripple factor in the torque has been reduced to a peak magnitude of $p'$. By substantially reducing this ripple factor in the starting torque, the present invention exhibits improved start-up characteristics due to the drive current overlap, which characteristics would not otherwise be attained if the drive currents were controlled so as not to overlap. That is, by reducing the ripple factor, the average starting torque attained by the present invention is greater than the average starting torque which would be attained if current overlap is avoided during the start-up operation. As a numerical example, the starting torque shown in FIG. 5A is produced by drive currents having a current angle of approximately 120° in each of phases 11, 12 and 13; whereas the torque shown in FIG. 5B is produced by drive currents having a current angle of almost 180° in each of the stator phases.

As mentioned previously, if overlapping drive currents are provided when the motor reaches its normal operating speed, the resultant magnetic flux produced by such overlapping currents would be reduced as compared to the magnetic flux which is produced if the drive currents do not overlap. This reduction in magnetic flux means that more power must be supplied to the motor in order to drive it at its normal operating speed. This inefficiency is avoided in accordance with the present invention because overlapping portions of the drive currents are reduced once the motor has commenced rotation. That is, since the current angle of the drive currents is reduced from almost 180° to approximately 120° at normal motor speeds, the problem of reduced magnetic flux caused by overlapping drive currents is avoided. Thus, less power is needed to drive the motor once it reaches its normal operating speed, thereby resulting in improved efficiency.

If the current through each phase of the stator windings is supplied as a rectangular pulse, the drive current would change rapidly at the leading and trailing edges of such a pulse. However, the magnetic flux produced by the rotor tends to generate a current which opposes this drive current, thereby causing a gradual reduction in the current flowing through that phase. A superposition of such a drive current, showing the gradual reduction therein, and magnetic flux produced by the rotor, is shown in FIG. 6 wherein the solid curve represents the pulsed drive current and the broken curve represents the magnetic flux produced by the rotor. As shown, this magnetic flux tends to reduce the drive current flowing through the stator phase. Once the flux reaches a maximum, this drive current reaches a minimum. A subsequent decrease in flux from the rotor, as when the rotor continues to rotate, results in an increase in the drive current.

A schematic representation of a portion of one of the stator winding phases is shown in FIG. 7A. Current through adjacent conductors in this phase flows in the same direction, as shown in FIG. 7B. As is known, when current flows through a conductor, a force F is exerted thereon. Such forces exerted upon adjacent conductors also are shown in FIG. 7B. Since the forces F exerted on the conductors are a function of the current flowing therethrough, these forces change abruptly if the current is subjected to a sudden change. Thus, if a rectangular pulse of current is supplied to each stator phase, the forces exerted on the conductors in that phase change abruptly at the leading and trailing edges of the current pulse. Consequently, the conductors will vibrate, thus producing undesired noise during operation of the motor.

Vibration of the conductors in the stator windings is avoided when the driving circuit shown in FIG. 2 is used because, as illustrated in FIGS. 3D and 3E, each of transistors 31, 32 and 33 is rendered conductive and then non-conductive in a gradual manner. Hence, the drive current flowing through each stator phase and through each transistor has a gradually increasing portion, a substantially constant portion and a gradually decreasing portion (FIG. 3E). This avoids an abrupt increase and decrease in the drive currents. This slope in the leading and trailing edges of the drive current is illustrated in FIG. 8. In this figure, the flux from the rotor linking the stator phase is shown by the superposed broken curve.

Although the problem of vibration in the stator windings may be compensated by providing capacitors in the driving circuit so as to avoid sudden changes in the driving current, the circuit shown in FIG. 2 obviates the need for such capacitors. Hence, this circuit is of relatively simplified construction.

Another embodiment of a drive circuit in accordance with the present invention is illustrated in FIG. 9 wherein the same reference numerals are used to identify the same components which were described hereinabove with respect to FIG. 2. In the embodiment of FIG. 9, amplifier 3 and diodes 61, 62 and 63 are replaced by amplifier 3', a capacitor 7 and a resistor 8. Resistor 8 is connected in common to the emitters of all of transistors 31, 32 and 33 so as to develop a voltage thereacross proportional to the drive current which flows through each of phases 11, 12 and 13. The voltage produced across resistor 8 is supplied through capacitor 7 to the inverting input of amplifier 3'. This amplifier has a noninverting input adapted to be supplied with a reference potential $E_f$. A feedback resistor 6 interconnects the output of amplifier 3' with its inverting input, such that this amplifier resembles a differentiating circuit. The input impedance of amplifier 3' is dependent upon the reactance of capacitor 7, and thus is frequency-dependent. That is, the input impedance of amplifier 3' decreases as the frequency of the voltage applied thereto from resistor 8 through capacitor 7 increases. As in the embodiment of FIG. 2, the output of amplifier 3' supplies a control current $I_d$ to each of Hall elements 21, 22 and 23.

In operation, a voltage is produced across resistor 8 whenever any one or more of transistors 31, 32 and 33 is conductive. During normal operation of the motor, transistors 31, 32 and 33 are rendered conductive sequentially such that successive currents having a duration of 120° flow through the stator phases, these transistors and resistor 8. Consequently, a fluctuating voltage is produced across resistor 8. This fluctuating voltage is supplied through capacitor 7 to the inverting input of amplifier 3', whereby this amplifier produces control current $I_d$ which is proportional to the difference between reference potential $E_f$ and the voltage applied to the amplifier inverting input. As the motor speed increases, the frequency of the fluctuating voltage produced across resistor 8 correspondingly increases while the impedance due to capacitor 7 decreases. This, in turn, reduces the control current $I_d$ produced by amplifier 3'. Conversely, if the motor speed decreases, the frequency of the fluctuating voltage produced across resistor 8 correspondingly decreases, but the impedance due to capacitor 7 increases. Hence, the control current $I_d$ produced by amplifier 3' increases. Since the output voltage $E_i$ produced by the Hall elements is a function of control current $I_d$, this output voltage increases so as to increase the duration during which the respective transistors are conductive, thereby increasing the drive currents supplied to the stator phases. Thus, the speed of the motor is regulated.

For a start-up operation, phases 11, 12 and 13 initially have no currents flowing therethrough. Hence, the voltage across resistor 8 initially is zero. Thus, the control current $I_d$ produced by amplifier 3' is dependent primarily upon the reference potential $E_f$, and is a maximum. Consequently, output voltage $E_i$ produced by the respective Hall elements exhibits a relatively high magnitude, as shown in FIG. 3B. Output voltage $E_i$ after amplification, is supplied to the base electrodes of transistors 31, 32 and 33 as voltage $E_o$ having a relatively high magnitude, as shown in FIG. 3C. Consequently, the base current $I_b$ through each of the transistors also is relatively high, resulting in a greater current angle for the collector currents $I_c$ which flow through phases 11, 12 and 13. Therefore, the embodiment shown in FIG. 9 is effective to increase the duration of the drive currents during a motor start-up operation, thereby producing a high starting torque. However, as the speed of the motor increases, there is less attenuation of the voltage across resistor 8, and the magnitude of control current $I_d$ decreases. That is, as the motor speed increases, the effective gain of amplifier 3' is reduced. In this manner, a desirably high starting torque is attained, but the current angle of the respective drive currents through phases 11, 12 and 13 is reduced as the motor approaches its normal operating speed. Hence, the overlapping portions of the drive currents during normal motor operation are reduced, and substantially eliminated.

Figure 10:
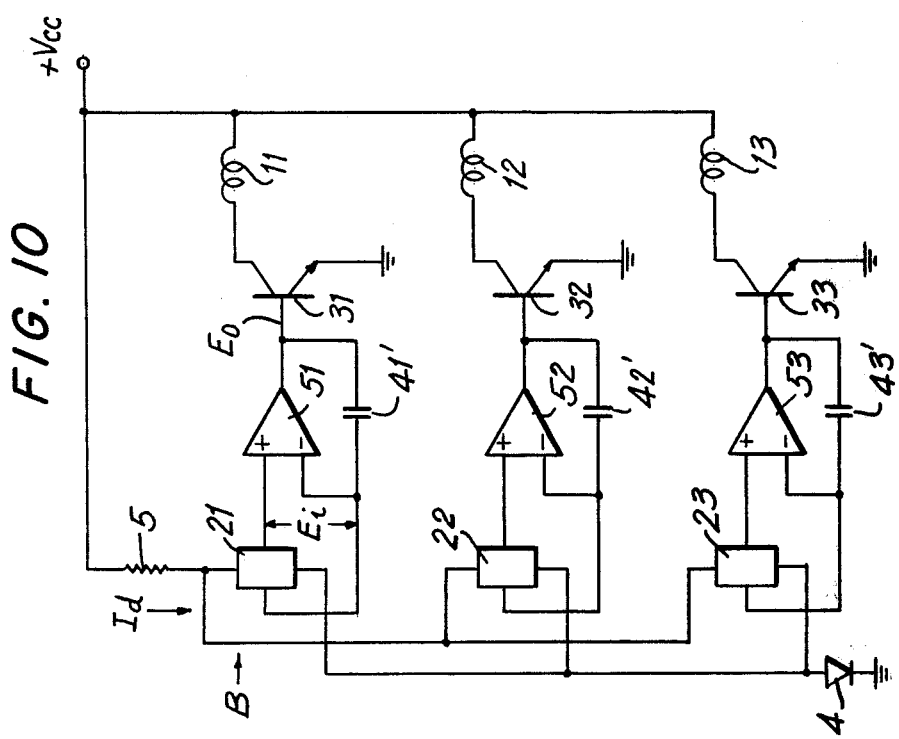
FIG. 10 is a schematic diagram of a still further embodiment of the present invention.

Yet another embodiment of a drive circuit in accordance with the present invention is illustrated in FIG. 10 wherein the same reference numerals have been used to identify the same components which were described previously with respect to FIG. 2. The embodiment illustrated in FIG. 10 differs from that shown in FIG. 2 in that amplifier 3 and diodes 61, 62 and 63 have been omitted. Also, feedback resistors 41, 42 and 43 in FIG. 2 are replaced by feedback capacitors 41', 42' and 43'. In the embodiment of FIG. 10, a substantially constant control current $I_d$ is supplied from the sources of operating potential $+V_{cc}$ through resistor 5 to each of Hall elements 21, 22 and 23. This control current is maintained constant during both a start-up operation and during a normal motor operation. By using feedback capacitors 41', 42' and 43', the gain of each of amplifiers 51, 52 and 53 is made dependent upon the frequency of output voltage $E_i$. In a start-up operation, output voltage $E_i$ exhibits a very low frequency. In fact, at the instant of start-up, this voltage is substantially a DC level. Accordingly, the gain of amplifiers 51, 52 and 53 is relatively high, thereby applying a relatively high level amplified voltage $E_o$ to transistors 31, 32 and 33. As shown in FIGS. 3C, 3D and 3E, this high magnitude of voltage $E_o$ increases the duration during which the respective transistors are conductive, thereby increasing the current angle of the drive currents which flow through phases 11, 12 and 13 and through conducting transistors 31, 32 and 33, respectively. Therefore, a relatively high starting torque is produced because of the overlap in the drive currents.

As the rotational speed of the motor increases, the fluctuation of voltage $E_i$ (FIG. 3B) increases in frequency, although the magnitude of this voltage remains substantially the same as during start-up. As the frequency of voltage $E_i$ increases, the gain of amplifiers 51, 52 and 53 decreases. Hence, amplified voltage $E_o$ now applied to transistors 31, 32 and 33 is reduced in magnitude. As shown in FIGS. 3C, 3D and 3E, if the magnitude of voltage $E_o$ is reduced, the duration during which each transistor is rendered conductive also is reduced, thereby reducing the current angle of the drive currents which flow through phases 11, 12 and 13. Therefore, it is appreciated that in the embodiment shown in FIG. 10, a high starting torque is produced because the drive currents through the respective stator phases exhibit overlapping portions; but as the motor speed increases, the duration of each drive current is reduced so as to minimize and even eliminate the overlaps therein. Accordingly, the drive circuit operates at a relatively higher efficiency during normal motor operation than would otherwise be attained if the normal drive currents overlapped with each other.

Figure 11:
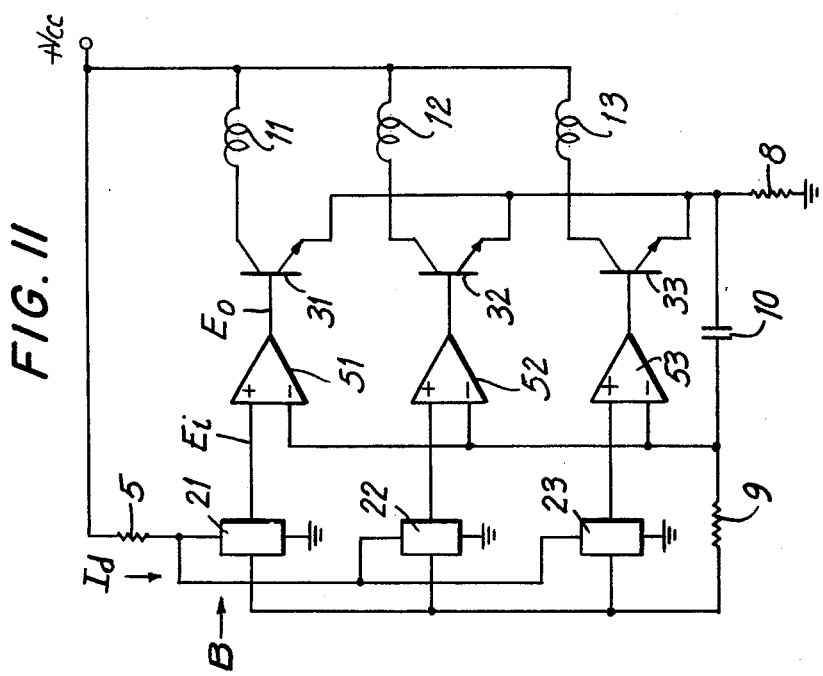
FIG. 11 is a schematic diagram of yet a further embodiment of the present invention.

A still further embodiment of a drive circuit in accordance with the present invention is shown in FIG. 11 wherein the same reference numerals have been used to identify the same components which were described with respect to FIG. 9. The embodiment of FIG. 11 differs from that shown in FIG. 9 in that amplifier 3' is omitted; and a substantially constant control current $I_d$ is derived from operating voltage $+V_{cc}$ and is supplied through resistor 5 to each of Hall elements 21, 22 and 23. A resistor 9 is connected in common between each of Hall elements 21, 22 and 23 and the inverting input of amplifiers 51, 52 and 53, respectively. This resistor tends to make the difference voltages supplied by the Hall elements to the respective amplifiers more uniform. The voltage produced across resistor 8 as a function of the drive currents flowing through phases 11, 12 and 13 is supplied through a capacitor 10 to the inverting input of each amplifier. Since the voltage across resistor 8 is supplied through a frequency-dependent element to amplifiers 51, 52 and 53, the effective gain of each amplifier is reduced as the frequency of this voltage increases. Thus, for a start-up operation wherein the voltage across resistor 8 is substantially equal to zero, amplifiers 51, 52 and 53 exhibit maximum gain such that voltage $E_o$ is a maximum. As shown in FIGS. 3C, 3D and 3E, maximum base current $I_b$ is applied to transistors 31, 32 and 33 when voltage $E_o$ is a maximum, thereby increasing the duration of the collector currents $I_c$ flowing through each transistor. This, in turn, produces a relatively high starting torque. As the motor speed increases, the fluctuating frequency of the voltage across resistor 8 also increases. Since the impedance to this voltage presented by capacitor 10 is reduced as the frequency increases, the voltage which is applied to the inverting inputs of amplifiers 51, 52 and 53 is increased. This reduces the effective gain of the amplifiers so as to correspondingly reduce the magnitude of voltage $E_o$. Hence, the current angle of the drive currents flowing through each of phases 11, 12 and 13 also is reduced. Therefore, it is appreciated that the embodiment shown in FIG. 11 produces a relatively high starting torque because of the overlap in the respective drive currents flowing through the stator phases; and as the motor approaches its normal speed, such overlapping portions in the drive currents are reduced and even eliminated. Consequently, the motor is driven at relatively high efficiency when it reaches its normal operating speed.

While the present invention has been described in conjunction with preferred embodiments, it should be readily apparent that various changes and modifications in form and details can be made without departing from the spirit and scope of this invention. For example, the motor with which the drive circuit can be used may be provided with additional rotor poles and/or with additional stator phases. Also, the rotor may surround the stator, rather than being disposed internally thereof. As another alternative, Hall elements 21, 22 and 23 may be replaced by other position detecting devices, such as photosensors, magnetic sensors, tone generators, and the like. As a still further alternative, transistors 31, 32 and 33 may be replaced by other equivalent switching devices, such as SCR's, or the like. As an additional alternative, resistor 8, which is used to sense the currents flowing through the stator phases, may be replaced by a frequency-dependent element, such as a capacitor or the like, so as to produce a control signal whose magnitude varies as the speed of the motor. This variable magnitude signal can, in turn, be used to control the gains of amplifiers 51, 52 and 53, or to determine the control current $I_d$ which is applied to the position detectors. As still another alternative, a controllable bias circuit may be provided to supply a bias current to amplifiers 51, 52 and 53 or to transistors 31, 32 and 33, which bias current performs substantially the same function as the aforedescribed control current $I_d$ shown in the embodiments of FIGS. 2 and 9. Therefore, it is intended that the appended claims be interpreted as including the foregoing, as well as various other such changes and modifications.

What is claimed is:

1. A driving circuit for a brushless motor of the type having a permanent magnet rotor and plural phase stator windings, said driving circuit comprising position detecting means for detecting the rotary position of said rotor; means for supplying driving currents in sequence to the plural phases of said stator windings in accordance with the position of said rotor detected by said detecting means, a portion of the driving currents flowing through at least two of said phases being overlapped when said motor is started up; and means for reducing the duration of each driving current as the motor approaches a normal speed so as to correspondingly reduce the overlapped portions of said driving currents flowing through said phases.

2. The driving circuit of claim 1 wherein said means for supplying driving currents to said phases comprises a plurality of switch means equal in number to the number of said phases, each switch means being connected in series with a respective stator winding phase.

3. The driving circuit of claim 2 wherein said position detecting means comprises a plurality of position detectors equal in number to the number of said phases, each position detector producing a time-varying signal representing the position of said rotor with respect thereto; and further comprising means for supplying the time varying signals produced by said position detectors to corresponding ones of said switch means.

4. The driving circuit of claim 3 wherein each of said switch means includes a threshold level, said switch means being rendered conductive when and for as long as the time-varying signal supplied thereto exceeds said threshold level so as to conduct drive current through the stator winding phase connected thereto, said time-varying signal having a gradually increasing portion and a gradually decreasing portion and having the magnitude thereof decrease from a maximum level following initial start-up of said motor.

5. The driving circuit of claim 4 wherein said means for reducing the duration of each driving current comprises control signal generating means for generating a control signal having an initial magnitude when said motor is started up and for applying said control signal to each of said position detectors, the time-varying signals produced by said position detectors being a function of said control signal; sensing means for sensing when more than one switch means is rendered conductive at any given time; and means responsive to said sensing means for changing said control signal generated by said control signal generating means so as to correspondingly reduce the time-varying signals produced by said position detectors.

6. The driving circuit of claim 5 wherein said control signal generating means comprises an amplifier, and means for applying a predetermined signal level to said amplifier to generate said control signal; and said means for changing said control signal comprises means for reducing said predetermined signal level applied to said amplifier.

7. The driving circuit of claim 6 wherein said switch means comprises a transistor having its collector-emitter circuit connected in series with a respective stator winding phase; and said sensing means comprises a plurality of diodes having one electrode thereof connected in common and the other electrode thereof connected to a respective transistor collector, said common connected electrodes having a relatively low voltage thereat whenever any of said transistors is conductive, said low voltage being applied to said means for reducing said predetermined signal level.

8. The driving circuit of claim 4 wherein said means for reducing the duration of each driving current comprises control signal generating means for generating a control signal having an initial magnitude when said motor is started up and for applying said control signal to each of said position detectors, the time-varying signals produced by said position detectors being a function of said control signal; sensing means for sensing the currents flowing through said stator winding phases; and frequency-dependent means responsive to said sensed currents for changing said control signal generated by said control signal generating means as the frequency of said currents increases so as to correspondingly reduce the time-varying signals produced by said position detectors.

9. The driving circuit of claim 8 wherein said control signal generating means comprises an amplifier having a first input for receiving a predetermined signal level; and said frequency-dependent means comprises capacitive reactance means connected to a second input of said amplifier for coupling said sensing means to said amplifier.

10. The driving circuit of claim 9 wherein said switch means each comprises a transistor having its collector-emitter circuit connected in series with a respective stator winding phase; and said sensing means comprises an impedance connected in common to all of the transistor emitters to produce an voltage proportional to the currents flowing through said stator winding phases.

11. The driving circuit of claim 4 wherein said means for supplying the time-varying signals produced by said position detectors to corresponding ones of said switch means comprises a plurality of amplifiers, each connected to a respective switch means.

12. The driving circuit of claim 11 wherein said means for reducing the duration of each driving current comprises frequency-dependent feedback means coupled to each said amplifier for feeding back the time-varying signal supplied to each switch means so as to reduce the effective gain of each amplifier as the frequency of said time-varying signals increases, thereby reducing the magnitude of the time-varying signals supplied to said switch means.

13. The driving circuit of claim 11 wherein said means for reducing the duration of each driving current comprises sensing means for sensing the currents flowing through said stator winding phases; and frequency-dependent means responsive to said sensed currents and coupled to all of said amplifiers for reducing the effective gain of each amplifier as the frequency of said currents increases, thereby reducing the magnitude of the time-varying signals supplied to said switch means.

14. The driving circuit of claim 13 wherein said switch means each comprises a transistor having its collector-emitter circuit connected in series with a respective stator winding phase; and said sensing means comprises an impedance connected in common to all of the transistor emitters to produce a voltage proportional to the currents flowing through said stator winding phases, said voltage being applied to said frequency-dependent means.

15. The driving circuit of claim 3 wherein each position detector includes a Hall effect element responsive to the magnetic flux generated by said permanent magnet rotor to produce said time-varying signal as said magnetic flux changes when said rotor rotates.

16. A driving circuit for a brushless motor of the type having a permanent magnet rotor and plural phase stator windings, said driving circuit comprising a plurality of position detectors equal in number to the number of said phases, each position detector producing a time-varying output representing the position of said rotor with respect thereto; a plurality of transistor means equal in number to the number of said phases, each transistor means having an output circuit connected in series with a corresponding stator winding phase and having an input for receiving a time-varying signal such that when said received time-varying signal exceeds a predetermined threshold said transistor means is rendered conductive to cause current to flow through said corresponding stator winding phase; a plurality of amplifiers equal in number to the number of said transistor means for receiving the time-varying output produced by a corresponding position detector and for applying a time-varying signal to a corresponding transistor means in response thereto; means for controlling the magnitude of said time-varying signals applied to said transistor means at least during a motor start-up operation such that the currents flowing through said stator winding phases have portions thereof which overlap with each other when said motor is started up, the durations of said currents being reduced as the speed of said motor increases to substantially remove said overlapped portions.

* * * * *